United States Patent
Zhang et al.

(10) Patent No.: US 11,409,968 B2
(45) Date of Patent: Aug. 9, 2022

(54) LANGUAGE CONVERSION METHOD AND APPARATUS BASED ON SYNTACTIC LINEARITY, AND NON-TRANSITORY COMPUTER-READABLE STORAGE MEDIUM

(71) Applicant: BEIJING BAIDU NETCOM SCIENCE AND TECHNOLOGY CO., LTD., Beijing (CN)

(72) Inventors: Ruiqing Zhang, Beijing (CN); Chuanqiang Zhang, Beijing (CN); Hao Xiong, Beijing (CN); Zhongjun He, Beijing (CN); Hua Wu, Beijing (CN); Haifeng Wang, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 168 days.

(21) Appl. No.: 16/926,197

(22) Filed: Jul. 10, 2020

(65) Prior Publication Data
US 2021/0192150 A1 Jun. 24, 2021

(30) Foreign Application Priority Data
Dec. 20, 2019 (CN) .......................... 201911324032.6

(51) Int. Cl.
 *G06F 40/55* (2020.01)
 *G06F 40/211* (2020.01)
 *G06F 40/58* (2020.01)
(52) U.S. Cl.
 CPC ............ *G06F 40/55* (2020.01); *G06F 40/211* (2020.01); *G06F 40/58* (2020.01)
(58) Field of Classification Search
 None
 See application file for complete search history.

(56) References Cited

U.S. PATENT DOCUMENTS

| 2018/0046618 A1* | 2/2018 | Lee .................... G06F 16/3344 |
| 2018/0075343 A1* | 3/2018 | van ven Oord ...... G06N 3/0454 |

(Continued)

FOREIGN PATENT DOCUMENTS

| CN | 106126507 A | 11/2016 |
| CN | 106202059 A | 12/2016 |

(Continued)

OTHER PUBLICATIONS

Song, Kaitao, et al. "Mass: Masked sequence to sequence pre-training for language generation." arXiv preprint arXiv: 1905.02450 (2019). (Year: 2019).*

(Continued)

*Primary Examiner* — Douglas Godbold
(74) *Attorney, Agent, or Firm* — Fay Sharpe LLP

(57) ABSTRACT

Embodiments of the present disclosure provide a language conversion method and apparatus based on syntactic linearity and a non-transitory computer-readable storage medium. The method includes: encoding a source sentence to be converted by using a preset encoder to determine a first vector and a second vector corresponding to the source sentence; determining a current mask vector according to a preset rule, in which the mask vector is configured to modify vectors output by the preset encoder; determining a third vector according to target language characters corresponding to source characters located before a first source character; and decoding the first vector, the second vector, the mask vector, and the third vector by using a preset decoder to generate a target character corresponding to the first source character.

16 Claims, 3 Drawing Sheets

(56) References Cited

U.S. PATENT DOCUMENTS

| | | | |
|---|---|---|---|
| 2018/0329897 A1* | 11/2018 | Kalchbrenner | G06N 3/084 |
| 2018/0341860 A1* | 11/2018 | Shazeer | G06N 3/08 |
| 2019/0057081 A1* | 2/2019 | Choi | G06N 3/08 |
| 2021/0110258 A1* | 4/2021 | Lee | G06F 40/40 |
| 2021/0133535 A1* | 5/2021 | Zhao | G06N 3/0445 |
| 2021/0182501 A1* | 6/2021 | Tu | G06F 40/40 |

FOREIGN PATENT DOCUMENTS

| | | |
|---|---|---|
| CN | 107729324 A | 2/2018 |
| CN | 108363702 A | 8/2018 |
| CN | 110147554 A | 8/2019 |
| CN | 110192206 A | 8/2019 |
| CN | 110211570 A | 9/2019 |
| JP | 2018026127 A | 2/2018 |
| JP | 2020506466 A | 2/2020 |
| KR | 20180062003 A | 6/2018 |

OTHER PUBLICATIONS

Sun, Zewei, et al. "Alleviating the inequality of attention heads for neural machine translation." arXiv preprint arXiv:2009.09672 (2020). (Year: 2020).*

Office Action for Chinese Application No. 201911324032.6, dated Aug. 10, 2020, 12 pages.

Hongyu et al., "Types and Rules of Syntactic Linearity in Simultaneous Interpreting", Chinese Translators Journal, May 2005, vol. 26, No. 3, 5 pages (English Abstract).

Business Cooperation and Negotiation Interpretation Practice Report, 4 pages (English Abstract), Aug. 2016.

Pengchen Yin et al., "A Syntactic Neural Model for General-Purpose Code Generation", Proceedings of the 55th Annual Meeting of the Association for Computational Linguistics, Jul. 30-Aug. 4, 2017 pp. 440-450.

"Visual Translation of English and Chinese Attributive Clauses Under the Principle of Sentence-Drive Malixin", 3 pages (English Abstract), Dec. 31, 2018.

Office Action for Japanese Application No. 2020-202351, dated Dec. 7, 2021, 4 pages.

Hangsuke I Second et al., "The extension to a simultaneous translation corpus from the bilingual corpus by an outside binary name and style conversion technology", Information Processing Society of Japan, vol. 2019-NL-241, No. 21, Aug. 30, 2019, 9 pages.

K-chousa et al., "Examination of an outside binary name and the neural machine translation in English-Japanese simultaneous translation", Proceedings of the 25th Annual General Assembly of Language Processing Society (Mar. 4, 2019), 4 pages.

Katsuhito Sudoh, Advances of Neural Machine Translation, "Evolution of Sequence-to-Sequence Models and Their Applications", Jul. 1, 2019, 9 pages.

* cited by examiner

LANGUAGE CONVERSION METHOD AND APPARATUS BASED ON SYNTACTIC LINEARITY, AND NON-TRANSITORY COMPUTER-READABLE STORAGE MEDIUM

CROSS-REFERENCE TO RELATED APPLICATION

The present application is based upon and claims priority to Chinese Patent Application No. 201911324032.6, filed on Dec. 20, 2019, the entirety contents of which are incorporated herein by reference.

TECHNICAL FIELD

The present disclosure relates to a field of computer technologies, specifically to a field of Natural Language Processing (NLP) technologies, and more particularly, to a language conversion method based on syntactic linearity and a language conversion apparatus based on syntactic linearity, and a non-transitory computer-readable storage medium.

BACKGROUND

In order to improve accuracy of translation results, generally, existing translation models generate a plurality of translation results during translation, and then according to alignment information corresponding to each translation result, a result whose alignment information is closest to a forward diagonal result is selected from the plurality of the translation results and output as a final translation result.

However, since training corpus of a translation model are mostly translation data including inverted sentences, even for translation results obtained by expanding translation candidates, when there are inverted sentences and sentences in a passive voice, the sentence is generally translated in an inverted manner, which not only causing a delay in sentence translation, but also affecting user experience due to non-syntactic linearity.

SUMMARY

The present disclosure provides a language conversion method based on syntactic linearity and a language conversion apparatus based on syntactic linearity, and a non-transitory computer-readable storage medium.

Embodiments of the present disclosure provide a language conversion method based on syntactic linearity. The method includes: encoding a source sentence to be converted by using a preset encoder to determine a first vector and a second vector corresponding to the source sentence; determining a current mask vector according to a preset rule, wherein the mask vector is configured to modify vectors output by the preset encoder; determining a third vector according to target language characters corresponding to source characters located before a first source character, in which the first source character is a current source character to be translated; and decoding the first vector, the second vector, the mask vector, and the third vector by using a preset decoder to generate a target character corresponding to the first source character.

Embodiments of the present disclosure provide a language conversion apparatus based on syntactic linearity. The apparatus is configured in an electronic device and includes: one or more processors; a memory storing instructions executable by the one or more processors; in which the one or more processors are configured to: encode a source sentence to be converted by using a preset encoder to determine a first vector and a second vector corresponding to the source sentence; determine a current mask vector according to a preset rule, in which the mask vector is configured to modify vectors output by the preset encoder; determine a third vector according to target language characters corresponding to source characters located before a first source character, in which the first source character is a current source character to be translated; and decode the first vector, the second vector, the mask vector, and the third vector by using a preset decoder to generate a target character corresponding to the first source character.

Embodiments of the present disclosure provide a non-transitory computer-readable storage medium storing computer instructions, in which when the computer instructions are executed, the computer is caused to implement a language conversion method based on syntactic linearity. The method includes: encoding a source sentence to be converted by using a preset encoder to determine a first vector and a second vector corresponding to the source sentence; determining a current mask vector according to a preset rule, in which the mask vector is configured to modify vectors output by the preset encoder; determining a third vector according to target language characters corresponding to source characters located before a first source character, in which the first source character is a current source character to be translated; and decoding the first vector, the second vector, the mask vector, and the third vector by using a preset decoder to generate a target character corresponding to the first source character.

BRIEF DESCRIPTION OF THE DRAWINGS

The accompanying drawings are used to better understand the solution, and do not constitute a limitation on the disclosure, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

A language conversion method based on syntactic linearity and a language conversion apparatus based on syntactic linearity are provided according to embodiments of the present disclosure are described below with reference to the accompanying drawings.

In some application scenarios, syntactic linearity translation is required, for example, in simultaneous translation. Simultaneous translation is designed to translate sentences from a source language into a target language with high quality and low latency. There is a basic principle, i.e., the syntactic linearity, which means that translation is performed according to the word order and language order of the source language. However, currently, there is no guarantee of the syntactic linearity translation results in machine translation.

In the embodiments of the present disclosure, in the related art, when sentences such as an inverted sentence or a sentence in a passive voice appear, the translation model is generally performing translating in an inverted manner, which not only causing delay in sentence translation, but also causing problems due to non-syntactic linearity. Therefore, a language conversion method based on syntactic linearity is provided.

With the language conversion method based on syntactic linearity according to embodiments of the present disclosure, by introducing a mask vector in the attention layer of the decoder, and using the mask vector to modify the vectors output by the encoder, the attention of the translation model is controlled, and the problems of translation delay and non-syntactic linearity translation in the translation model in the related art are solved, thus the translation result of syntactic linearity is obtained, and translation delay is reduced.

Figure 1:
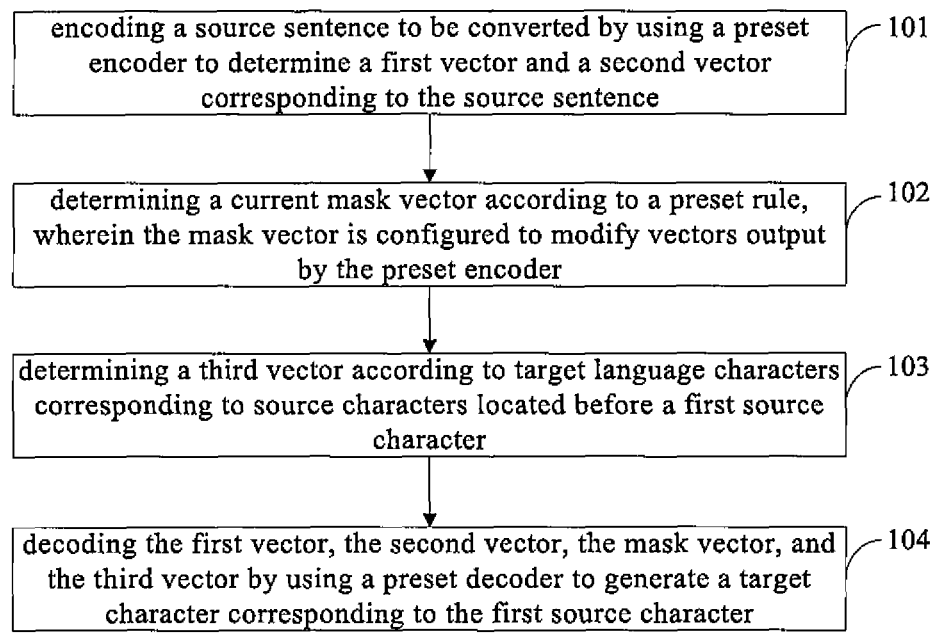
FIG. 1 is a flowchart of a language conversion method based on syntactic linearity according to an embodiment of the present disclosure.

FIG. 1 is a flowchart of a language conversion method based on syntactic linearity according to an embodiment of the present disclosure.

The language conversion method based on syntactic linearity according to an embodiment of the present disclosure may be executed by a language conversion apparatus based on syntactic linearity according to an embodiment of the present disclosure. The apparatus is configured in an electronic device to realize syntactic linearity translation.

As illustrated in FIG. 1, the language conversion method based on syntactic linearity includes the following steps.

At step 101, a source sentence to be converted is encoded by using a preset encoder to determine a first vector and a second vector corresponding to the source sentence.

In this embodiment, the preset encoder may include a multi-start attention layer and a feed-forward reverse network. The multi-start attention layer and the feed-forward reverse network are used to encode the source sentence to obtain the first vector and the second vector corresponding to the source sentence.

The first vector may be a key vector and the second vector is a value vector, or the first vector may be a value vector and the second vector is a key vector.

At step 102, a current mask vector is determined according to a preset rule, wherein the mask vector is configured to modify vectors output by the preset encoder.

In this embodiment, each time the source character is translated, the mask vector corresponding to the current source character to be translated is determined, and the mask vector is used to modify the first and second vectors of the vectors output by the preset encoder to control attention of the translation model.

The length of the mask vector is equal to a number of characters in the source sentence.

For example, the mask vector of length L is expressed as $[-c,-c, \ldots, -c, 0,0, \ldots, 0,-c,-c, \ldots, -c]$, in which c is an integer and the value of c is a preset empirical value. It can be seen that the mask vector includes three portions: a number $L_1$ of elements $-c$ before the elements 0, a number $L_2$ of consecutive elements of 0, and a number $L_3$ of elements $-c$. When the positions of the characters to be translated are different, the values of $L_1$, $L_2$, and $L_3$ are changeable.

At step 103, a third vector is determined according to target language characters corresponding to source characters located before a first source character.

The first source character is a current source character to be translated.

During translation, in order to improve the translation effect, the next character is translated according to the characters of the target language that have been translated. In this embodiment, the third vector is determined by performing vector representation on the target language characters corresponding to the source characters located before the first source character. That is, the third vector is determined based on the target language characters that have been obtained by translating the source sentence.

In detail, vector mapping is, performed on each of the translated target characters that have been translated to obtain word vectors, and then the word vectors are fused to generate the third vector.

At step 104, the first vector, the second vector, the mask vector, and the third vector are decoded by using a preset decoder to generate a target character corresponding to the first source character.

In this embodiment, the preset decoder may include a multi-start attention layer. The first vector, the second vector, the mask vector, and the third vector are used as inputs of the multi-start attention layer, and the preset decoder is used to decode to obtain a target language character corresponding to the first source character, that is, the first source character of the source language is converted into the target language character. Therefore, by introducing the mask vector in the attention, the attention of the translation model is controlled and it is ensured that the translation result has forward diagonal alignment information, thus the translation result of syntactic linearity is obtained.

In this embodiment, the mask vector is used to modify the vectors output by the encoder. During translation, the mask vector is used to mask characters after the source character currently to be translated in the source sentence to avoid flip-over type of translation, so that the translation model performs translation according to the word order and language order of the source sentence, thereby obtaining the syntactic linearity translation.

The language conversion method based on syntactic linearity according to embodiments of the present disclosure, by introducing the mask vector in the attention layer of the decoder, and using the mask vector to modify the vectors output by the encoder, the attention of the translation model is controlled and it is ensured that the translation result has forward diagonal alignment information, thus the translation result of syntactic linearity is obtained, and translation delay is reduced.

In the determination of the current mask vector, in an embodiment of the present disclosure, the number of different value elements corresponding to the source characters at different positions may be predetermined, then a number of value elements in the current mask vector is determined according to a position of the first source character in the source sentence and a number of characters in the source sentence.

In detail, the length of the current mask vector is determined according to the number of characters in the source sentence, and the number of the value elements in the mask vector corresponding to the position of the first source character is determined according to the correspondence between the source characters at different positions specified in advance and the number of the value elements in the mask vector. Therefore, according to the number of the value elements in the mask vector, the current mask vector is determined.

For example, if the source sentence includes L characters, then the length of the mask vector is L, and the mask vector is expressed as $[-c,-c, \ldots, -c, 0,0, \ldots, 0,-c,-c, \ldots, -c]$. In this mask vector, the number of $-c$ before the element 0 is $L_1$, the number of consecutive elements 0 is $L_2$, and the number of $-c$ after the consecutive elements 0 is $L_3$, in which $L_1+L_2+L_3=L$. Then, according to the values of $L_1$, $L_2$ and $L_3$ corresponding to the predetermined source characters at different positions, the values of $L_1$, $L_2$ and $L_3$ corresponding to the positions of the source characters to be translated are determined. Further, according to the values of $L_1$, $L_2$ and $L_3$, the mask vector corresponding to the source character to be translated is determined.

That is, the source characters at different positions are directly specified, corresponding to different values of $L_1$, $L_2$ and $L_3$ that is, the values of $L_1$, $L_2$ and $L_3$ are directly specified, and the values of $L_1$, $L_2$ and $L_3$ are determined according to the position of the first source character, thus the amount of calculation is reduced.

It should be noted that the above mask vector including three portions $L_1$, $L_2$ and $L_3$, and three portions are only exemplary, which cannot be regarded as a limitation to the embodiment of the present disclosure.

In the embodiment of the present disclosure, the number of the value elements in the current mask vector is determined according to the position of the first source character in the source sentence and the number of characters in the source sentence, and the mask vector is determined according to the number of the value elements.

In the embodiment of the present disclosure, the number of the value elements in the mask vector may also be dynamically updated as the number of the target characters that had translated.

In detail, the number of the value elements in the current mask vector is determined according to the position of the first source character in the source sentence, the number of characters in the source sentence, and the number of the target language characters that had generated.

For example, the mask vector is represented as $[-c, -c, \ldots, -c, 0,0, \ldots, 0,-c,-c, \ldots, -c]$, in the mask vector, the number of $-c$ before the elements 0 is $L_1$, the number of consecutive elements 0 is $L_2$ the number of $-c$ after the elements 0 is $L_3$ and the values of $L_1$, $L_2$ and $L_3$ are determined as follows.

The source sentence starts with $L_1=0$, $L_2=4+\text{length(dec)}$, and $L_3=\text{length(source)}$, with $L_1=\text{length(dec)}-5$, $L_2=7$ and $L_3=\text{length(source)}-L_1-L_2$ in the middle, and ends with $L_1=\text{length(source)}-5$, $L_2=5$ and $L_3=0$.

length(source) represents the number of characters in the source sentence, and length(dec) represents the number of the target language characters that had generated. It can be seen that, according to the position of the first character in the source sentence, such as at the beginning, in the middle, or the end of the source sentence, the corresponding valuing method of $L_1$, $L_2$ and $L_3$ are determined. The specific value is determined depending on the number of characters in the source sentence, and the number of the target language characters that had generated.

It should be noted that the above is only a method for determining the values of $L_1$, $L_2$ and $L_3$ and the calculation method of the values of $L_1$, $L_2$ and $L_3$ may be adjusted as desired.

In the embodiment of the present disclosure, when determining the current mask vector, a number of value elements in the current mask vector is determined according to a position of the first source character in the source sentence, a number of characters in the source sentence, and a number of the target language characters that had generated. Therefore, during the decoding process, the mask vector is determined according to the number of the target language characters that had generated, so that the mask vector is dynamically changed as decoding proceeds, and the accuracy of the mask vector is improved.

Figure 2:
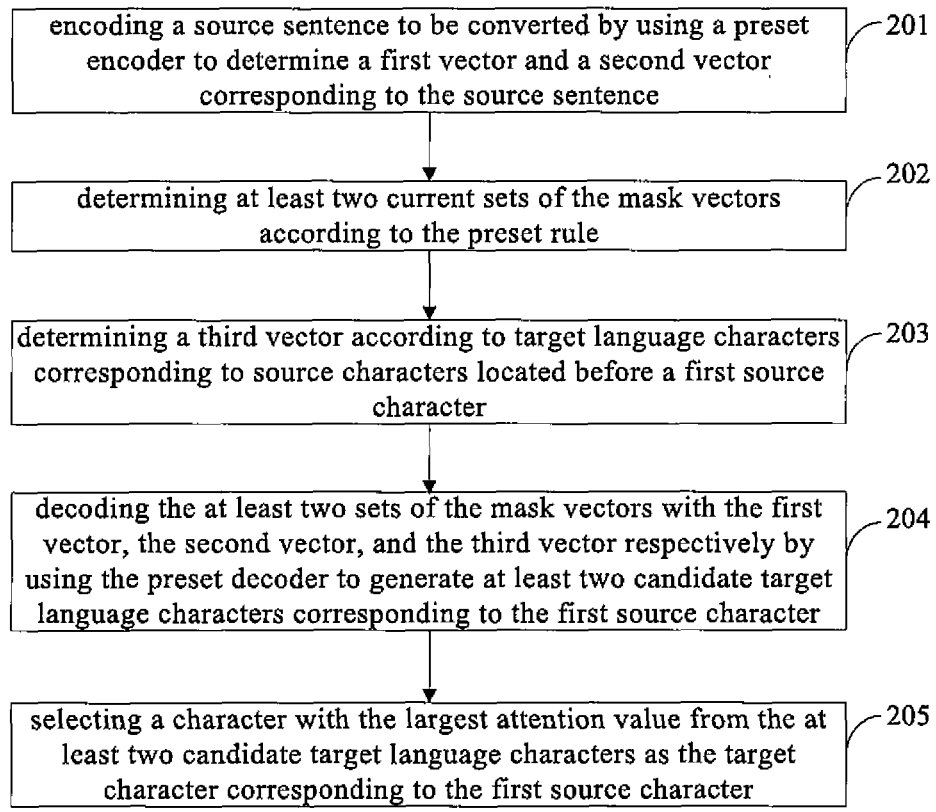
FIG. 2 is a flowchart of a language conversion method based on syntactic linearity according to another embodiment of the present disclosure.

In order to improve the accuracy of the syntactic linearity translation results, in an embodiment of the present disclosure, a plurality of the mask vectors may be obtained, and a plurality of translation results can be obtained based on the plurality of the mask vectors, and then the final translation result is selected from the plurality of the translation results. FIG. 2 is a flowchart of a language conversion method based on syntactic linearity according to an embodiment of the present disclosure.

As illustrated in FIG. 2, the language conversion method based on syntactic linearity includes the followings.

At step 201, a source sentence to be converted is encoded by using a preset encoder to determine a first vector and a second vector corresponding to the source sentence.

In this embodiment, step 201 is similar to step 101 described above, which is not be repeated herein.

At step 202, at least two current sets of the mask vectors are determined according to a preset rule.

In this embodiment, the number of the value elements in the mask vector is determined in two or more ways, thereby obtaining more than two sets of the mask vectors.

For example, a set of mask vectors is determined according to the way in which the source characters at different positions specified in advance correspond to the different number of the value elements. Moreover, the other set of the mask vectors is determined according to the position of the first source character in the source sentence and the number of characters in the source sentence, thus two sets of the mask vectors are obtained.

At step 203, a third vector is determined according to target language characters corresponding to source characters located before a first source character.

In this embodiment, step 203 is similar to step 103 described above, which is not be repeated herein.

At step 204, the at least two sets of the mask vectors are decoded with the first vector, the second vector, and the third vector respectively by using the preset decoder to generate at least two candidate target language characters corresponding to the first source character.

In this embodiment, at least two sets of mask vectors are obtained, and the preset decoder is used to decode each set of the mask vectors with the first vector, the second vector, and the third vector to generate corresponding candidate target language characters. Thus, according to at least two sets of the mask vectors, at least two candidate target language characters are generated correspondingly.

At step 205, a character with the largest attention value is selected from the at least two candidate target language characters as the target character corresponding to the first source character.

Since at least two candidate target language characters are obtained, the final character needs to be selected as the translation result corresponding to the first character.

The greater the attention value corresponding to the target language character, the better the alignment between the source character to be translated and the target language character, then the greater the possibility of syntactic linearity translation. Therefore, in this embodiment, the character with the largest attention value is selected from the at least two candidate target language characters as the target character corresponding to the first source character.

In detail, the attention value is calculated according to the following formula:

$$\text{Attention }(q, k, v) = \text{soft max}\left(\frac{kq^T + \text{mask}}{\sqrt{d}}\right)v,$$

where Attention(q,k,v) represents an attention value, k represents a key vector, v represents a value vector, and q represents a vector of the target language character that had generated, that is, the third vector, mask represents the mask vector, and d represents a dimension of a hidden layer of a translation model. If k represents the first vector, then v is the second vector.

With the language conversion method based on syntactic linearity according to embodiments of the present disclosure, at least two sets of the mask vectors are determined and then decoded with the first vector, the second vector, and the third vector respectively to generate at least two candidate target language characters corresponding to the first source character. The character with the largest attention value is selected from the at least two candidate target language characters as the target character corresponding to the first source character. Therefore, by selecting the character with the best degree of alignment with the source character to be translated is selected as the target character, thereby improving the accuracy of syntactic linearity translation.

Figure 3:
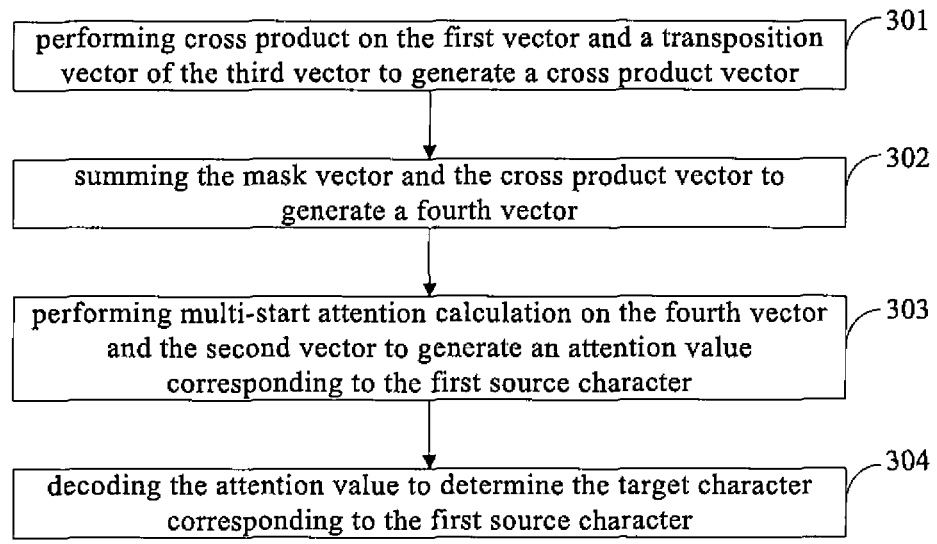
FIG. 3 is a flowchart of a language conversion method based on syntactic linearity according to yet another embodiment of the present disclosure.

In an embodiment of the present disclosure, inputting the first vector, the second vector, the mask vector, and the third vector to the preset decoder for decoding process may be implemented in the manner shown in FIG. 3. FIG. 3 is a flowchart of a language conversion method based on syntactic linearity according to an embodiment of the present disclosure.

As illustrated in FIG. 3, decoding the first vector, the second vector, the mask vector, and the third vector by using the preset decoder to generate the target character corresponding to the first source character, includes the following steps.

At step 301, cross product is performed on the first vector and a transposition vector of the third vector to generate a cross product vector.

In this embodiment, the third vector is first transposed to obtain the transposition vector of the third vector, and then cross product is performed on the first vector and the transposition vector of the third vector to generate a cross product vector. The dimension of the cross product vector and the mask vector are the same.

At step 302, the mask vector and the cross product vector are summed to generate a fourth vector.

After obtaining the cross product vector, the mask vector and the cross vector are summed, that is, the elements at the corresponding positions in the two vectors are summed to generate the fourth vector.

At step 303, multi-start attention calculation is performed on the fourth vector and the second vector to generate an attention value corresponding to the first source character.

After obtaining the fourth vector, the attention value corresponding to the first source character is calculated according to the dimensions of the fourth vector, the second vector, and the hidden layer of the model.

In detail, calculation is performed according to the above formula $$\text{Attention }(q, k, v) = \text{soft max}\left(\frac{kq^T + \text{mask}}{\sqrt{d}}\right)v,$$

where Attention(q,k,v) represents an attention value, k represents a key vector, V represents a value vector, and q represents the third vector, mask represents the mask vector, and d represents a dimension of the hidden layer of the translation model.

At step 304, the attention value is decoded to determine the target character corresponding to the first source character.

After obtaining the attention value, the attention value is decoded to generate a decoded character as the target character corresponding to the first source character. In detail, the existing decoding method may be adopted, which is not repeated herein.

The language conversion method based on syntactic linearity according to the embodiment of the present disclosure uses the mask vector to modify the vectors output by the encoder, the mask vector is introduced in the attention calculation. The mask vector masks the characters after the current source character to be translated in the source sentence through the mask vector, so that the decoder generates the target language character corresponding to the source character currently to be translated according to the characters before the source character currently to be translated and the target language characters that had generated, thus the translation result of syntactic linearity is obtained, and translation delay is reduced.

Figure 4:
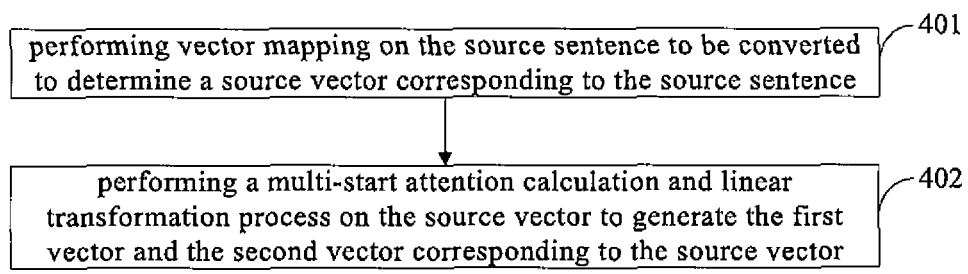
FIG. 4 is a flowchart of a language conversion method based on syntactic linearity according to still another embodiment of the present disclosure.

In an embodiment of the present disclosure, when the preset encoder is used to encode the source sentence to be converted to determine the first vector and the second vector corresponding to the source sentence, the first vector and the second vector are obtained according to the method in FIG. 4. FIG. 4 is a flowchart of a language conversion method based on syntactic linearity according to an embodiment of the present disclosure.

As illustrated in FIG. 4, encoding the source sentence to be converted to determine the first vector and the second vector corresponding to the source sentence, includes the following steps.

At step 401, vector mapping is performed on the source sentence to be converted to determine a source vector corresponding to the source sentence.

In this embodiment, vector mapping is performed on the source sentence to be converted to generate a word vector and a position vector corresponding to the source sentence, and then the word vector and the position vector are summed to obtain the source vector corresponding to the source sentence.

At step 402, a multi-start attention calculation and linear transformation process are performed on the source vector to generate the first vector and the second vector corresponding to the source vector.

After obtaining the source vector corresponding to the source sentence, the multi-start attention calculation is performed on the source vector to obtain a vector, and then the vector is linearly transformed with different parameters to generate the first vector and the second vector corresponding to the source vector.

In the embodiment of the present disclosure, by performing vector mapping on the source sentence to be converted, the source vector corresponding to the source sentence is determined, and the source vector is subjected to the multi-start attention calculation and linear transformation process to generate the first vector and the second vector corresponding to the source vector. Thus, the first vector and the second vector corresponding to the source sentence are obtained.

Figure 5:
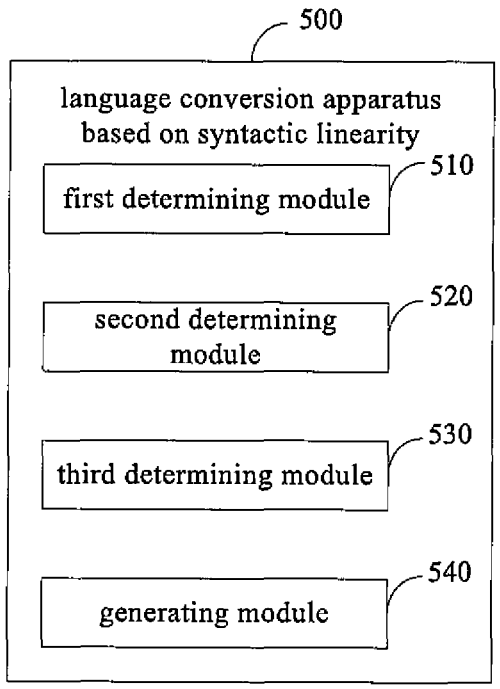
FIG. 5 is a schematic diagram of a language conversion apparatus based on syntactic linearity according to an embodiment of the present disclosure.

In order to implement the above embodiments, a language conversion apparatus based on syntactic linearity is provided. FIG. 5 is a schematic diagram of a language conversion apparatus 500 based on syntactic linearity according to an embodiment of the present disclosure.

As illustrated in FIG. 5, the language conversion apparatus 500 based on syntactic linearity includes: a first determining module 510, a second determining module 520, a third determining module 530 and a generating module 540.

The first determining module 510 is configured to encode a source sentence to be converted by using a preset encoder to determine a first vector and a second vector corresponding to the source sentence.

The second determining module 520 is configured to determine a current mask vector according to a preset rule, in which the mask vector is configured to modify vectors output by the preset encoder.

The third determining module 530 is configured to determine a third vector according to target language characters corresponding to source characters located before a first source character, in which the first source character is a current source character to be translated.

The generating module 540 is configured to decode the first vector, the second vector, the mask vector, and the third vector by using a preset decoder to generate a target character corresponding to the first source character.

In a possible implementation of the embodiments of the present disclosure, the second determining module 520 is configured to determine a number of value elements in the current mask vector according to a position of the first source character in the source sentence and a number of characters in the source sentence.

In a possible implementation of the embodiments of the present disclosure, the second determining module 520 is configured to determine a number of value elements in the current mask vector according to a position of the first source character in the source sentence, a number of characters in the source sentence, and a number of the target language characters that had generated.

In a possible implementation of the embodiments of the present disclosure, the second determining module 520 is configured to determine at least two current sets of the mask vectors according to the preset rule.

The generating module 540 is configured to: decode the at least two sets of the mask vectors with the first vector, the second vector, and the third vector respectively by using the preset decoder to generate at least two candidate target language characters corresponding to the first source character; and select a character with the largest attention value from the at least two candidate target language characters as the target character corresponding to the first source character.

In a possible implementation of the embodiments of the present disclosure, the generating module 540 is further configured to: perform cross product on the first vector and a transposition vector of the third vector to generate a cross product vector; sum the mask vector and the cross product vector to generate a fourth vector; perform multi-start attention calculation on the fourth vector and the second vector to generate an attention value corresponding to the first source character; decode the attention value to determine the target character corresponding to the first source character.

In a possible implementation of the embodiments of the present disclosure, the first determining module 510 is further configured to: perform vector mapping on the source sentence to be converted to determine a source vector corresponding to the source sentence; perform a multi-start attention calculation and linear transformation process on the source vector to generate the first vector and the second vector corresponding to the source vector.

It should be noted that the foregoing explanation of the embodiment of the language conversion method based on syntactic linearity is also applicable for the language conversion apparatus based on syntactic linearity of this embodiment, which is not repeated herein.

With the language conversion apparatus based on syntactic linearity of the embodiments of the present disclosure, a source sentence to be converted is encoded by using a preset encoder to determine a first vector and a second vector corresponding to the source sentence. A current mask vector is determined according to a preset rule, in which the mask vector is configured to modify vectors output by the preset encoder. A third vector is determined according to target language characters corresponding to source characters located before a first source character, in which the first source character is a current source character to be translated. The first vector, the second vector, the mask vector, and the third vector are decoded by using a preset decoder to generate a target character corresponding to the first source character. Therefore, this method introduces the mask vector in the attention layer of the decoder, and uses the mask vector to modify the vectors output by the encoder, thereby controlling the attention of the translation model and ensuring that the translation result has forward diagonal alignment information, thus the translation result of syntactic linearity is obtained, and translation delay is reduced.

According to the embodiments of the present disclosure, the present disclosure also provides an electronic device and a readable storage medium.

Figure 6:
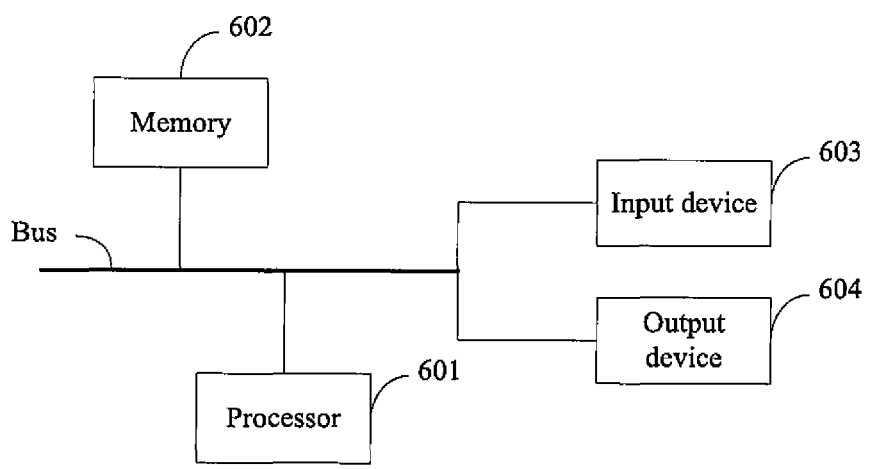
FIG. 6 is a block diagram of an electronic device to implement the language conversion method based on syntactic linearity according to an embodiment of the present disclosure.

FIG. 6 is a block diagram of an electronic device to implement the language conversion method based on syntactic linearity according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 6, the electronic device includes: one or more processors 601, a memory 602, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 601 is taken as an example in FIG. 6.

The memory 602 is a non-transitory computer-readable storage medium according to the present disclosure. The memory stores instructions executable by at least one processor, so that the at least one processor executes the voice control method according to the present disclosure. The non-transitory computer-readable storage medium of the present disclosure stores computer instructions, which are used to cause a computer to execute the voice control method according to the present disclosure.

As a non-transitory computer-readable storage medium, the memory 602 is configured to store non-transitory software programs, non-transitory computer executable programs and modules, such as program instructions/modules corresponding to the voice skill creation method in the embodiment of the present disclosure (For example, the first determining module 510, the second determining module 520, the third determining module 530 and the generating module 540 shown in FIG. 5). The processor 601 executes various functional applications and data processing of the server by running non-transitory software programs, instructions, and modules stored in the memory 602, that is, implementing the language conversion method based on syntactic linearity in the foregoing method embodiment.

The memory 602 may include a storage program area and a storage data area, where the storage program area may store an operating system and application programs required for at least one function. The storage data area may store data created according to the use of the electronic device, and the like. In addition, the memory 602 may include a high-speed random access memory, and a non-transitory memory, such as at least one magnetic disk storage device, a flash memory device, or other non-transitory solid-state storage device. In some embodiments, the memory 602 may optionally include a memory remotely disposed with respect to the processor 601, and these remote memories may be connected to the electronic device through a network. Examples of the above network include, but are not limited to, the Internet, an intranet, a local area network, a mobile communication network, and combinations thereof.

The electronic device for implementing the language conversion method based on syntactic linearity may further include: an input device 603 and an output device 604. The processor 601, the memory 602, the input device 603, and the output device 604 may be connected through a bus or in other manners. In FIG. 6, the connection through the bus is taken as an example.

The input device 603 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 604 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

In this technical solution of the embodiments of the present disclosure, by introducing the mask vector in the attention layer of the decoder, and using the mask vector to modify the vectors output by the encoder, the attention of the translation model is controlled, it is ensured that the translation result has forward diagonal alignment information, thus the translation result of syntactic linearity is obtained, and translation delay is reduced.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" means two or more than two, unless specified otherwise.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A language conversion method based on syntactic linearity, comprising:
    encoding a source sentence to be converted by using a preset encoder to determine a first vector and a second vector corresponding to the source sentence;
    determining a current mask vector according to a preset rule, wherein the mask vector is configured to modify vectors output by the preset encoder;
    determining a third vector according to target language characters corresponding to source characters located before a first source character, wherein the first source character is a current source character to be translated; and
    decoding the first vector, the second vector, the mask vector, and the third vector by using a preset decoder to generate a target character corresponding to the first source character;
    wherein determining the current mask vector according to the preset rule comprises:
    determining at least two current sets of the mask vectors according to the preset rule; and
    the decoding the first vector, the second vector, the mask vector, and the third vector by using the preset decoder to generate the target character corresponding to the first source character, comprising:
    decoding the at least two sets of the mask vectors with the first vector, the second vector, and the third vector respectively by using the preset decoder to generate at least two candidate target language characters corresponding to the first source character; and
    selecting a character with the largest attention value from the at least two candidate target language characters as the target character corresponding to the first source character.

2. The method according to claim 1, wherein the determining the current mask vector according to the preset rule comprises:
    determining a number of value elements in the current mask vector according to a position of the first source character in the source sentence and a number of characters in the source sentence.

3. The method according to claim 2, wherein the encoding the source sentence to be converted to determine the first vector and the second vector corresponding to the source sentence comprises:
    performing vector mapping on the source sentence to be converted to determine a source vector corresponding to the source sentence;
    performing a multi-start attention calculation and linear transformation process on the source vector to generate the first vector and the second vector corresponding to the source vector.

4. The method according to claim 1, wherein the determining the current mask vector according to the preset rule comprises:
    determining a number of value elements in the current mask vector according to a position of the first source character in the source sentence, a number of characters in the source sentence, and a number of the target language characters that had generated.

5. The method according to claim 4, wherein the encoding the source sentence to be converted to determine the first vector and the second vector corresponding to the source sentence comprises:
    performing vector mapping on the source sentence to be converted to determine a source vector corresponding to the source sentence;
    performing a multi-start attention calculation and linear transformation process on the source vector to generate the first vector and the second vector corresponding to the source vector.

6. The method according to claim 1, the decoding the first vector, the second vector, the mask vector, and the third vector by using the preset decoder to generate the target character corresponding to the first source character, comprising:
    performing cross product on the first vector and a transposition vector of the third vector to generate a cross product vector;
    summing the mask vector and the cross product vector to generate a fourth vector;
    performing multi-start attention calculation on the fourth vector and the second vector to generate an attention value corresponding to the first source character;
    decoding the attention value to determine the target character corresponding to the first source character.

7. The method according to claim 6, wherein the encoding the source sentence to be converted to determine the first vector and the second vector corresponding to the source sentence comprises:
    performing vector mapping on the source sentence to be converted to determine a source vector corresponding to the source sentence;
    performing a multi-start attention calculation and linear transformation process on the source vector to generate the first vector and the second vector corresponding to the source vector.

8. The method according to claim 1, wherein the encoding the source sentence to be converted to determine the first vector and the second vector corresponding to the source sentence comprises:
    performing vector mapping on the source sentence to be converted to determine a source vector corresponding to the source sentence;

performing a multi-start attention calculation and linear transformation process on the source vector to generate the first vector and the second vector corresponding to the source vector.

9. A language conversion apparatus based on syntactic linearity, configured in an electronic device and comprising:
one or more processors;
a memory storing instructions executable by the one or more processors;
wherein the one or more processors are configured to:
encode a source sentence to be converted by using a preset encoder to determine a first vector and a second vector corresponding to the source sentence;
determine a current mask vector according to a preset rule, wherein the mask vector is configured to modify vectors output by the preset encoder;
determine a third vector according to target language characters corresponding to source characters located before a first source character, wherein the first source character is a current source character to be translated; and
decode the first vector, the second vector, the mask vector, and the third vector by using a preset decoder to generate a target character corresponding to the first source character;
wherein the one or more processors are configured to:
determine at least two current sets of the mask vectors according to the preset rule; and
decode the at least two sets of the mask vectors with the first vector, the second vector, and the third vector respectively by using the preset decoder to generate at least two candidate target language characters corresponding to the first source character; and
select a character with the largest attention value from the at least two candidate target language characters as the target character corresponding to the first source character.

10. The apparatus according to claim 9, wherein the one or more processors are configured to:
determine a number of value elements in the current mask vector according to a position of the first source character in the source sentence and a number of characters in the source sentence.

11. The apparatus according to claim 10, wherein the one or more processors are configured to:
perform vector mapping on the source sentence to be converted to determine a source vector corresponding to the source sentence;
perform a multi-start attention calculation and linear transformation process on the source vector to generate the first vector and the second vector corresponding to the source vector.

12. The apparatus according to claim 9, wherein the one or more processors are configured to:
determine a number of value elements in the current mask vector according to a position of the first source character in the source sentence, a number of characters in the source sentence, and a number of the target language characters that had generated.

13. The apparatus according to claim 12, wherein the one or more processors are configured to:
perform vector mapping on the source sentence to be converted to determine a source vector corresponding to the source sentence;
perform a multi-start attention calculation and linear transformation process on the source vector to generate the first vector and the second vector corresponding to the source vector.

14. The apparatus according to claim 9, wherein the one or more processors are configured to:
perform cross product on the first vector and a transposition vector of the third vector to generate a cross product vector;
sum the mask vector and the cross product vector to generate a fourth vector;
perform multi-start attention calculation on the fourth vector and the second vector to generate an attention value corresponding to the first source character;
decode the attention value to determine the target character corresponding to the first source character.

15. The apparatus according to claim 9, wherein the one or more processors are configured to:
perform vector mapping on the source sentence to be converted to determine a source vector corresponding to the source sentence;
perform a multi-start attention calculation and linear transformation process on the source vector to generate the first vector and the second vector corresponding to the source vector.

16. A non-transitory computer-readable storage medium storing computer instructions, wherein when the computer instructions are executed, the computer is caused to implement a language conversion method based on syntactic linearity, and the method comprises:
encoding a source sentence to be converted by using a preset encoder to determine a first vector and a second vector corresponding to the source sentence;
determining a current mask vector according to a preset rule, wherein the mask vector is configured to modify vectors output by the preset encoder;
determining a third vector according to target language characters corresponding to source characters located before a first source character, wherein the first source character is a current source character to be translated; and
decoding the first vector, the second vector, the mask vector, and the third vector by using a preset decoder to generate a target character corresponding to the first source character;
wherein determining the current mask vector according to the preset rule comprises:
determining at least two current sets of the mask vectors according to the preset rule; and
the decoding the first vector, the second vector, the mask vector, and the third vector by using the preset decoder to generate the target character corresponding to the first source character, comprising:
decoding the at least two sets of the mask vectors with the first vector, the second vector, and the third vector respectively by using the preset decoder to generate at least two candidate target language characters corresponding to the first source character; and
selecting a character with the largest attention value from the at least two candidate target language characters as the target character corresponding to the first source character.

* * * * *